United States Patent [19]

Ando

[11] Patent Number: 5,216,501
[45] Date of Patent: Jun. 1, 1993

[54] APPARATUS FOR DETECTING MOVING AND UNMOVING REGIONS IN A MOVING IMAGE USING A CALCULATOR

[75] Inventor: Shigeru Ando, Tokyo, Japan

[73] Assignee: Matsushita Electric Industrial Co., Ltd., Osaka, Japan

[21] Appl. No.: 476,906

[22] Filed: Feb. 8, 1990

[30] Foreign Application Priority Data

Feb. 13, 1989 [JP] Japan ................................ 1-33046

[51] Int. Cl.⁵ ............................................ H04N 7/18
[52] U.S. Cl. ..................................... 358/105; 358/125
[58] Field of Search ............... 358/105, 125, 126, 136; 364/516; 382/16

[56] References Cited

U.S. PATENT DOCUMENTS

| | | | |
|---|---|---|---|
| 4,719,584 | 1/1988 | Rue et al. | 358/126 X |
| 4,853,775 | 8/1989 | Rouvrais et al. | 358/105 |
| 4,937,667 | 6/1990 | Choquet et al. | 358/140 |
| 4,979,036 | 12/1990 | Smith | 358/105 |
| 4,980,762 | 12/1990 | Heeger et al. | 358/105 X |

FOREIGN PATENT DOCUMENTS 0177763  4/1986  European Pat. Off. .

OTHER PUBLICATIONS

"On The Computation of Motion From Sequences of Images–A Review" by J. K. Aggarwal; Proceedings of IEEE: vol. 76, No. 8, Aug., 1988 pp., 917–935.
"Computational Aspects of Determining Optical Flow" by D. Lee et al; 2nd International Conference on Computer Vision: Dec. 1988; pp., 612–618.
"Determining Optical Flow" by Horn et al; Artificial Intelligence 17 (1981) pp., 185–203.
"Computing Motion Using Analog and Binary Resistive Networks" by Hutchinson et al; Nikkei Electronics 1988 8.8.; pp., 175–185 (This is a Japanese translation of a report printed in IEEE Computer, vol. 21, No. 3, pp., 52–63, Mar. 1988.)

Primary Examiner—Victor R. Kostak
Attorney, Agent, or Firm—Lowe, Price, LeBlanc & Becker

[57] ABSTRACT

An apparatus for detecting moving and unmoving regions in a moving image includes three memories for storing differentiation results of respective pixels in an x component, a y component, and a time component from two moving image data which are temporally successive. A first calculator reads out values of pixels near respective pixels in arbitrary two of the three memories, and calculates all quantities of multiplication/addition between the pixels. A second calculator calculates a value equivalent to a covariance determinant of vectors of an x component, a y component, and a time component from six results of the multiplication/addition. A third calculator calculates a multiplication between a time differentiation energy and a square of a spatial differentiation energy from results of the calculation of the second calculator and the pixel data values stored in the memories. A judgment device calculates a ratio of a result of an addition between an output data from the third calculator and an error energy.

5 Claims, 8 Drawing Sheets

APPARATUS FOR DETECTING MOVING AND UNMOVING REGIONS IN A MOVING IMAGE USING A CALCULATOR

BACKGROUND OF THE INVENTION

This invention relates to an apparatus for detecting moving and unmoving regions in a moving image which is usable in various systems such as a video data compressing system or a scene-change detecting system.

There are known apparatuses for detecting conditions of a moving image. As will be explained later, these known apparatuses have a problem.

SUMMARY OF THE INVENTION

It is an object of this invention to provide an excellent apparatus for detecting moving and unmoving regions in a moving image.

An apparatus for detecting moving and unmoving regions in a moving image includes three memories for storing differentiation results of respective pixels in an x component, a y component, and a time component from two moving image data which are temporally successive. A first calculator reads out values of pixels around the pixel to which this calculation means is directed from any combination of two memories described above, and calculates all quantities of multiplication/addition between the pixels. A second calculator calculates a value equivalent to a covariance determinant of vectors of an x component, a y component, and a time component from six results of the multiplication/addition. A third calculator calculates a multiplication between a time differentiation energy and a square of a spatial differentiation energy from results of the calculation of the second calculator and the pixel data values stored in the memories. A judgment device calculates a ratio of a result of an addition between an output data from the third calculator and an error energy.

DESCRIPTION OF THE PRIOR ART

Figure 1:
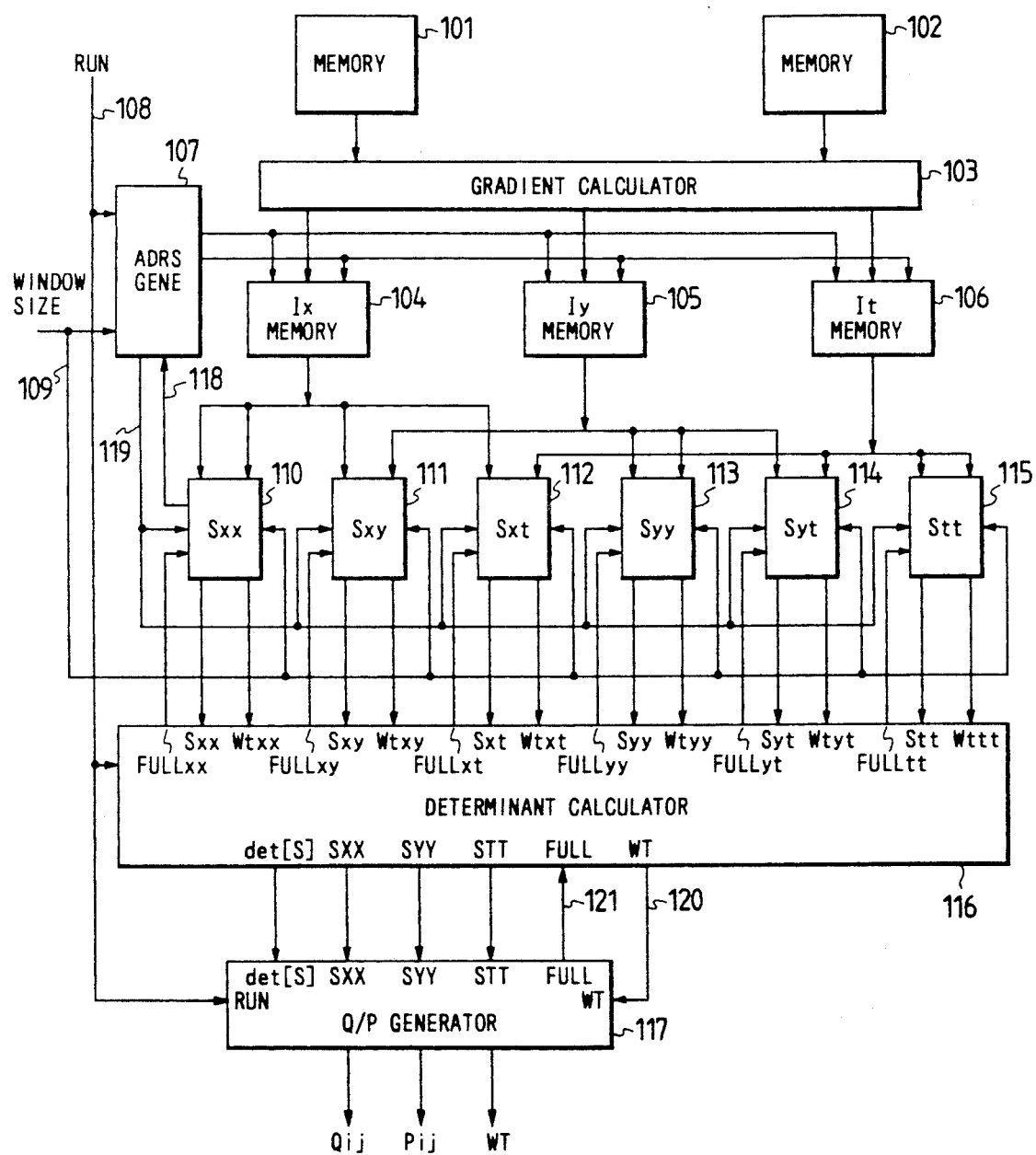
FIG. 1 is a block diagram of an apparatus for detecting moving and unmoving regions in a moving image according to an embodiment of this invention.

Prior-art methods and apparatuses will be explained hereinafter for a better understanding of this invention.

It is known to detect a moving object in a moving image on the basis of the brightness of the object. In this known method, the velocities of respective points of the moving image and the directions of the motions of the points are calculated from spatial and temporal gradients of the brightnesses. In the known method, obtained information relates to a velocity of the whole of the image, that is, a field of motion vectors, and the moving object is detected reversely from the motion vector field.

An equation for the brightness which varies in accordance with the motion of an image will now be determined. The brightness of a point (x, y) at a time t is denoted as I(x, y, t). From the microscopic viewpoint, the motion of an image holds the conditions where the brightness pattern I(x, y, t) is translated in accordance with a velocity field at each of local regions. When these conditions are seen from a coordinate system moving at an identical velocity with a local velocity, the pattern undergoes no variation and the Lagrange's differentiation of the pattern is 0. Thus, the following equation is held.

$$DI/Dt = \{I(x + Udt, y + Vdt) - I(x, y, t)\}/dt \qquad (1)$$
$$= UIx + VIy + It = 0$$

The equation (1) is satisfied at each of local regions of the whole image. Since the equation (1) has two unknown values U and V, it is not possible to solve the equation (1).

In order to solve the equation (1), Horn and Schunk introduce the following constraints (see "Determining Optical Flow", Artificial Intelligence, Vol. 17, 1981, pages 185-203).

In general, when an object undergoes a rigid motion, the object except isolated discontinuous points is smooth and neighboring points on the object have similar velocities. This fact is reflected in the velocity field. Accordingly, the velocity field is provided with a constraint such that the velocity field varies smoothly as long as the object undergoes a smooth motion. The degree of smoothness is measured by the square of gradients of the velocity field. Thus, the following constraint is given.

$$(\partial U/\sigma x)^2 + (\partial U/\sigma y)^2 + (\partial V/\sigma x)^2 + (\partial V/\sigma y)^2 \qquad (2)$$

The constraint equation (2) is applied to the equation (1), and thus a variational function is determined. A final velocity field (U, V) is given as minimizing the following equation.

$$E(U, V) = \int \int_\Gamma \left\{ (IxU + IyV + It)^2 + \lambda \left[ \left( \frac{\partial U}{\sigma x} \right)^2 + \left( \frac{\partial U}{\sigma y} \right)^2 + \left( \frac{\partial V}{\sigma x} \right)^2 + \left( \frac{\partial V}{\sigma y} \right)^2 \right] \right\} dxdy \qquad (3)$$

where the character $\lambda$ denotes a weight coefficient inversely proportional to an S/N (a signal-to-noise ratio). The first term of the right-hand side of the equation (3) reveals that a final solution approaches measured data as close as possible. The second term of the right-hand side of the equation (3) is a constraint for smoothing the solution. The degree of the minimization is determined by the weight coefficient $\lambda$. In the case where accurate data are used, disturbing the first term will cause a high cost and the weight coefficient $\lambda$ is made small. In the case where used data are low in S/N, the second term should be emphasized and the weight coefficient $\lambda$ is made large.

Energy E(U, V) is a quadratic function of unknown values U and V. According to a general method of calculating a variation, Euler-Lagrange's differential equations are expressed as the following linear equations with respect to the values U and V.

$$Ix^2 U + IxIyV - \lambda \nabla^2 U + IxIt = 0 \\ IxIyU + Iy^2 V - \lambda \nabla^2 V + IyIt = 0 \quad \} \quad (4)$$

In this way, there are two linear equations for each point.

The equations (4) are solved as follows. The equations (4) can be converted into the following difference equations.

$$Ixij^2 Uij + IxijIyijVij - \lambda(Ui + 1j + Uij + 1 - 4Uij + \\ Ui - 1j + Uij - 1) + IxijItij = 0 \\ IxijIyijUij + Iyij^2 Vij - \lambda(Vi + 1j + Vij + 1 - 4Vij + \\ Vi - 1j + Vij - 1) + IyijItij = 0 \quad \} \quad (5)$$

where Laplacian ($\nabla^2$) is replaced by approximation using five orthogonal lattice points.

Figure 6:
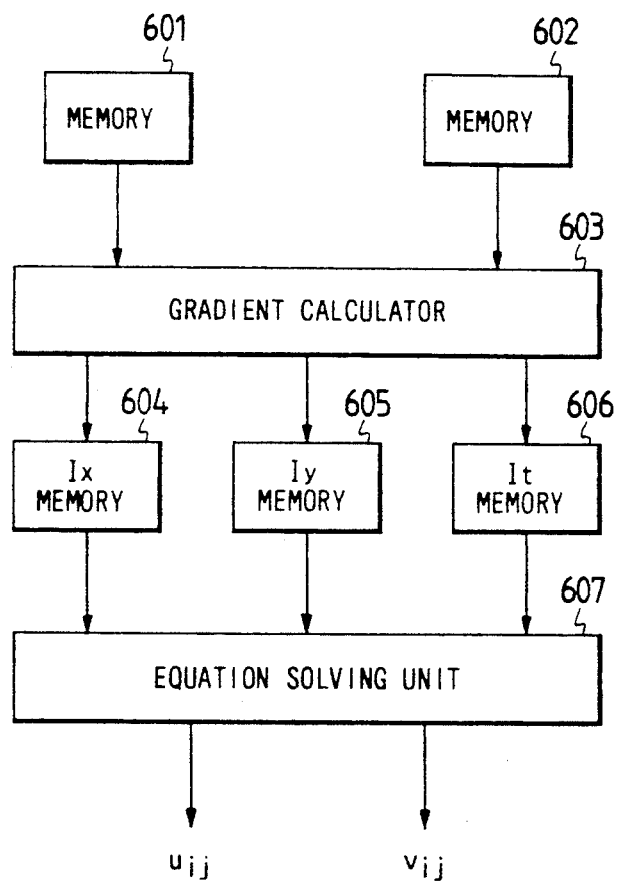
FIG. 6 is a block diagram of a prior-art apparatus for detecting a velocity field.

FIG. 6 shows a prior-art apparatus using the equations (5). With reference to FIG. 6, a memory 601 is loaded with data of brightness patterns of a moving image which occurs at a time t. A memory 602 is loaded with data of brightness patterns of the moving image which occurs at a time t+Δt. A gradient calculation unit 603 fetches the brightness patterns from the memories 601 and 602 and calculates gradients Ix, Iy, and It where $Ix = \partial I/\partial x$, $Iy = \partial I/\partial y$, and $It = \partial I/\partial t$. Specifically, the gradients can be calculated from the image data by use of a suitable differentiating operator such as Robert's gradient. Data of the calculated gradients Ix, Iy, and It are stored from the gradient calculation unit 603 into memories 604, 605, and 606 respectively. It should be noted that the capacity of the memories 601, 602, 604, 605, and 606 is chosen to correspond to the number of lattice points used in the equations (5).

A difference equation solving unit 607 functions to solve the equations (5). The difference equation solving unit 607 receives values Ixij, Iyij, and Itij for a lattice point (i, j) from the memories 604, 605, and 606 respectively, and derives values Uij and Vij by use of a suitable boundary condition and outputs the values Uij and Vij.

Japanese magazine "NIKKEI ELECTRONICS 1988. 8. 8 (No. 453)", pages 171-185, or United States journal "IEEE COMPUTER", vol. 21, No. 3, pages 52-63 discloses a method of quickly solving the equations (5) by referring to resistive networks.

Figure 7:
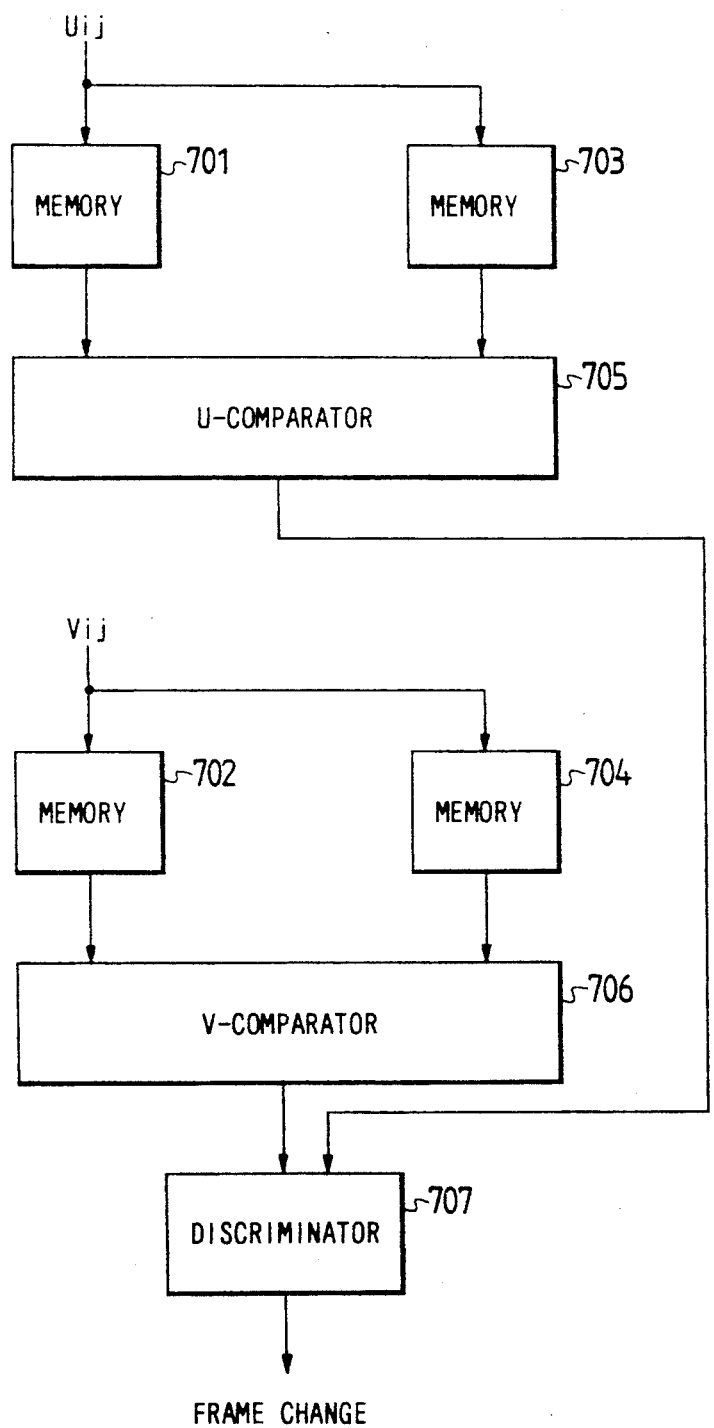
FIG. 7 is a block diagram of a prior-art apparatus for discriminating the appearance of an unexpected object.

FIG. 7 shows a prior-art apparatus for discriminating the appearance of an unexpected object which typically occurs when the scene of a succession of moving images changes. With reference to FIG. 7, memories 701 and 702 are respectively loaded with data of the values Uij and Vij outputted from the apparatus of FIG. 6 for a current frame of a moving image. Memories 703 and 704 are respectively loaded with data of the values Uij and Vij outputted from the apparatus of FIG. 6 for a subsequent frame of the moving image.

In the apparatus of FIG. 7, a variation of the velocity field of the moving image is detected from successive velocity field images, and a change of the scene of the moving image is judged to be present when the detected variation is large. Accordingly, a comparator 705 receives the successive velocity values Uij from the memories 701 and 703 and calculates the difference ΔUij between the successive velocity values Uij. Similarly, a comparator 706 receives the successive velocity values Vij from the memories 702 and 704 and calculates the difference ΔVij between the successive velocity values Vij.

A discriminator 707 receives the differences ΔUij and ΔVij from the comparators 705 and 707 and detects a change of the scene from the differences ΔUij and ΔVij by referring to the following equation.

$$P = \sum_{ij} \sqrt{(\Delta Uij)^2 + (\Delta Vij)^2} - T \quad (6)$$

where the letter T denotes a predetermined threshold. Specifically, a change of the scene is judged to be present when the value P of the equation (6) is positive. A change of the scene is judged to be absent when the value P of the equation (6) is negative.

As described previously, in the prior-art apparatus and method related to FIG. 7, a velocity field is calculated, and a change of the scene of a moving image is judged to be present when the calculated velocity field undergoes a great variation. Thus, the velocity field is calculated at first to detect a change of the scene of a moving image.

However, a change of the scene is generally a singular time point where it is generally difficult to determine a velocity field. This is because objects suddenly appear and disappear at a change of the scene. In addition, at a change of the scene, respective points of an object do not locally undergo translation so that the equation (1) is unsatisfied.

Therefore, the prior-art apparatus and method related to FIG. 7 is forced to handle the appearance and disappearance of an object by use of a velocity field with a low reliability.

DESCRIPTION OF THE PREFERRED EMBODIMENT

This invention resolves the previously-mentioned problem in the prior-art apparatus and method. This invention is directed to an apparatus for detecting moving and unmoving regions in a moving image. The apparatus of this invention reliably detects the appearance and the disappearance of an object, and also reliably detects a change of a scene.

The concept of this invention will be explained hereinafter. In this invention, a first calculator calculates brightness gradient patterns Ixij, Iyij, and Itij at each of lattice points of an image. Then, values Sxx to Stt are calculated on the basis of the brightness gradient patterns Ixij, Iyij, and Itij by use of values within a region Γ around the lattice point (i, j). Specifically, the calculation of the values Sxx to Stt is executed by referring to the following equations.

$$Sxx = \sum_{i,j \in \Gamma} Ixij^2 \quad (7\text{-a})$$

$$Sxy = \sum_{i,j \in \Gamma} IxijIyij \quad (7\text{-b})$$

$$S_{yy} = \sum_{i,j \in \Gamma} Iy_{ij}^2 \quad (7\text{-c})$$

$$S_{xt} = \sum_{i,j \in \Gamma} Ix_{ij} It_{ij} \quad (7\text{-d})$$

$$S_{yt} = \sum_{i,j \in \Gamma} Iy_{ij} It_{ij} \quad (7\text{-e})$$

$$S_{tt} = \sum_{i,j \in \Gamma} It_{ij} It_{ij} \quad (7\text{-f})$$

Subsequently, a second calculator calculates the value det[s] by referring to the following equation.

$$det[S] = det\left(\begin{bmatrix} SxxSxySxt \\ SxySyySyt \\ SxtSytStt \end{bmatrix}\right) \quad (8)$$

Next, a third calculator calculates the appearance characteristic quantity Qij and the motion characteristic quantity Pij by referring to the following equations respectively.

$$Qij \equiv \frac{4det[S]}{(Sxx + Syy)^2 Stt + \sigma_s^2 \sigma_t^2} \quad (9)$$

$$Pij \equiv \frac{(Sxx + Sxy)^2 Stt - 4det[S]}{(Sxx + Sxy)^2 Stt + \sigma_s^4 \sigma_t^2} \quad (10)$$

where $\sigma_s^4 = \sigma_t^2 = 0.5^2 \cdot NO$, and the letter NO denotes the number of pixels within the region $\Gamma$. Subsequently, a judgment device judges whether a variation in data at each lattice point is of the appearance/disappearance type or of the motion type on the basis of the values Qij and Pij.

The previously-mentioned calculators and the judgment device will be further explained. A region around each point (x, y, t) of a moving image is denoted by the character $\Gamma$, and the first calculator determines the values Sxx to Stt by calculating the following integrals corresponding to the equations (7-a) to (7-f).

$$Sxx = \int\int_\Gamma Ix(x, y, t)^2 dxdy \quad (11)$$

$$Sxy = \int\int_\Gamma Ix(x, y, t) Iy(x, y, t) dxdy$$

$$Syy = \int\int_\Gamma Iy(x, y, t)^2 dxdy$$

$$Sxt = \int\int_\Gamma Ix(x, y, t) It(x, y, t) dxdy$$

$$Syt = \int\int_\Gamma Iy(x, y, t) It(x, y, t) dxdy$$

$$Stt = \int\int_\Gamma It(x, y, t)^2 dxdy$$

where $Ix \equiv \partial I/\partial x$, $Iy \equiv \partial I/\partial y$, and $It \equiv \partial I/\partial t$.

The parameter $II = {}^t(Ix, Iy, It)$ is introduced (the character "t" denotes transpose), and the matrix S handled in the second calculator is given as follows.

$$S = \begin{vmatrix} SxxSxySxt \\ SxySyySyt \\ SxtSytStt \end{vmatrix} = \int\int_\Gamma \begin{pmatrix} Ix \\ Iy \\ It \end{pmatrix}^{(IxIyIt)} dxdy = \int\int_\Gamma II \cdot {}^2II dxdy$$

The value det[S] is equal to or greater than 0. This is proved as follows.

For an arbitrary vector $x = {}^t(x1, x2, x3)$, the following relation is satisfied.

$${}^t x S x = \int\int_\Gamma {}^t x II^t II x dxdy$$

$$= \int\int_\Gamma {}^t({}^t II x)({}^t II x) dxdy$$

$$= \int\int_\Gamma {}^t a a dxdy \geq 0$$

where $a = {}^t II x$. Since the quadratic form ${}^t x S x$ is equal to or greater than 0 as indicated above, the determinant det[S] is also equal to or greater than 0. In other words, all the eigenvalues of the matrix S are equal to or greater than 0.

Conditions for more surely enabling the value det[S] to be 0 are generated when the equation (1) is satisfied. This means the following relation.

$$det[S] = 0 <=> UIx + VIy + WIt = 0 \quad (12)$$

It should be noted that dividing both sides of the right-hand equation (12) by W and newly defining U/W and V/W as U and W result in the equation (1). The relation (12) is proved as follows.

The proof related to a necessary condition will be made at first. Since det[S] = 0, the row vectors of the matrix S are not linear and independent. The row vectors of the matrix S are multiplied by (U, V, W) different from (0, 0, 0), and the resultants are added so that the following equations are obtained.

$$USxx + VSxy + WSxt = 0$$

$$USxy + VSyy + Wsyt = 0$$

$$USxt + VSyt + WStt = 0$$

Thus, the following equations are given.

$$\int\int_\Gamma Ix(UIx + VIy + WIt) dxdy = 0 \quad (13\text{-a})$$

$$\int\int_\Gamma Iy(UIx + VIy + WIt) dxdy = 0 \quad (13\text{-b})$$

$$\int\int_\Gamma It(UIx + VIy + WIt) dxdy = 0 \quad (13\text{-c})$$

The equations (13-a), (13-b), and (13-c) are multiplied by U, V, and W respectively, and the resultants are summed. Thus, the following equation is obtained.

$$\int\int_\Gamma (UIx + VIy + WIt)^2 dxdy = 0$$

Thereby, it is proved that $UIx+VIy+WIt=0$.

Secondly, the proof related to a sufficient condition will be made. Since the relation "$UIx+VIy+WIt=0$" stands good within the region $\Gamma$, the following equations are given.

$$\int\int_\Gamma Ix(UIx + VIy + WIt)dxdy = 0$$

$$\int\int_\Gamma Iy(UIx + VIy + WIt)dxdy = 0$$

$$\int\int_\Gamma It(UIx + VIy + WIt)dxdy = 0$$

These equations agree with the following equations.

$USxx + VSxy + WSxt = 0$ $USxy + VSyy + WSyt = 0$ $USxt + VSyt + WStt = 0$

Thus, it is revealed that the row vectors of the matrix S are linearly dependent. Therefore, the relation "$\det[S]=0$" is attained.

In other words, a judgement as to whether each point in the moving image undergoes motion or non-motion can be performed by checking that $\det[S]=0$. Accordingly, the value $\det[S]$ is calculated for each point of the moving image. As the calculated value $\det[S]$ is closer to 0, the related point is regarded as being more surely subjected to motion. As the calculated value $\det[S]$ is positive and remoter from 0, the related point is regarded as being more surely stationary. Thus, a change of the scene or a similar condition can be detected on the basis of the fact that the values $\det[S]$ for the respective points are sufficiently large.

However, the value of the characteristic quantity $\det[S]$ depends on the scales of the time axis and the amplitude of the brightness of an image. Motion or non-motion of a point is a characteristic intrinsically independent of the scales of such parameters. From a practical viewpoint, it is only possible that a judgement as to whether the value $\det[S]$ is close to 0 is performed by relative comparison with other parameters. Accordingly, it is considered that the value $\det[S]$ is made dimensionless and normalized.

Firstly, the dimensions of the respective elements of the matrix S are made in agreement. This process means that a unique local relation is given between time unit and distance unit. It is now assumed that the local time scale within the region $\Gamma$ is chosen so as to equalize $\{Sxx+Syy\}/2$ and $Stt$. Thus, the following equation is given.

$$v^2\{Sxx+Syy\} = 2Stt \tag{14}$$

The dimension of $v$ is $[LT^{-1}]$. The following matrix is now considered.

$$\Sigma \equiv \begin{bmatrix} v^2 Sxx & v^2 Sxy & v Sxt \\ v^2 Sxy & v^2 Syy & v Syt \\ v Sxt & v Syt & Stt \end{bmatrix} \tag{15}$$

The dimensions of the respective elements of this matrix agree with the dimension of Stt. The following relations stand good.

$\det(\Sigma) = v^4 \det[S]$ $\operatorname{trace}(\Sigma) = v^2(Sxx+Syy) + Stt = 3Stt$ Since the matrix S is positive definite, the eigenvalues $\lambda_1$, $\lambda_2$, and $\lambda_3$ of the matrix $\Sigma$ are equal to or greater than 0. The values $\det(\Sigma)$ and $\operatorname{trace}(\Sigma)$ are given as follows.

$\det(\Sigma) = \lambda_1 \cdot \lambda_2 \cdot \lambda_3$ $\operatorname{trace}(\Sigma) = \lambda_1 + \lambda_2 + \lambda_3$ The ratio U between the value $\det(\Sigma)$ and the cube of the value $\operatorname{trace}(\Sigma)/3$ is now introduced as follows.

$$U \equiv \frac{\lambda_1 \lambda_2 \lambda_3}{\{(\lambda_3 + \lambda_2 + \lambda_3)/3\}^3} = \frac{v^4 \det[S]}{Stt^3} \tag{16}$$

$$= \frac{4\det[S]}{(Sxx + Syy)^2 Stt}$$

Since the arithmetic mean and the geometric mean has the relation "$(\lambda_1 \cdot \lambda_2 \cdot \lambda_3)^{1/3} \leq (\lambda_1+\lambda_2+\lambda_3)$", this ratio U is a dimensionless quantity in the range between 0 and 1.

Under ideal conditions, the ratio U is a quantity representing whether each point is moving or unmoving. If the ratio U is directly used in the detection of motion, a meaningless motion of a degree comparable to a noise level tends to be judged as a significant motion. Accordingly, noise terms $\sigma_s^4$ and $\sigma_t^2$ are introduced, and the appearance characteristic quantity Q is defined as follows.

$$Q \equiv \frac{4\det[S]}{(Sxx + Syy)^2 Stt + \sigma_s^4 \cdot \sigma_t^2} \tag{17}$$

Since the energy of a quantization error is about $0.5^2$, the noise terms $\sigma_s^4$ and $\sigma_t^2$ are preferably set as $\sigma_s^4 = \sigma_t^2 = 0.5^2 \cdot NO$ where the letter NO denotes the number of pixels within the region $\Gamma$.

A variation irrelative to appearance can be regarded as a motion, and therefore the motion characteristic quantity Q is given as follows.

$$P \equiv \frac{(Sxx + Syy)^2 Stt - 4\det[S]}{(Sxx + Syy)^2 Stt + \sigma_s^4 \sigma_t^2} \tag{18}$$

The sum R of the values P and Q characterizes variations of any types. The sum R is expressed as follows.

$$R = P + Q = \frac{(Sxx + Syy)^2 Stt}{(Sxx + Syy)^2 Stt + \sigma_s^4 \sigma_t^2}$$

By referring to the characteristic quantities P and Q, it is possible to determine whether a variation at each point of a moving image results from a motion or an object appearance. The present invention uses this principle.

An embodiment of this invention will be described hereinafter with reference to drawings. FIG. 1 shows an apparatus for detecting moving and unmoving regions in a moving image according to an embodiment of this invention.

With reference to FIG. 1, a memory 101 is loaded with data of brightness patterns of a moving image which occur at a time t. A memory 102 is loaded with data of brightness patterns of the moving image which occur at a time $t+\Delta t$. A gradient calculation unit 103 fetches the brightness patterns from the memories 101 and 102 and calculates gradients Ix, Iy, and It where $Ix=\partial I/\sigma x$, $Iy=\partial I/\sigma y$, and $It=\partial I/\sigma t$. Specifically, the gradients can be calculated from the image data by use of a suitable differentiating operator such as Robert's gradient. Data of the calculated gradients Ix, Iy, and It are stored from the gradient calculation unit 103 into memories 104, 105, and 106 respectively. It should be noted that the capacity of the memories 101, 102, 104, 105, and 106 is chosen to correspond to the number of lattice points used in the equations (5).

An address generator 107 outputs address signals to the memories 104, 105, and 106. Data of the gradients Ix, Iy, and It which are designated by the address signals are read out from the memories 104, 105, and 106 and are then fed to multiplication/addition units 110, 111, 112, 113, 114, and 115. The address generator 107 outputs write signals to the multiplication/addition units 110-115 which determine a timing of writing the data into input storage sections of the units 110-115. The address generator 107 and the multiplication/addition units 110-115 receive a window size designation signal 109 which determines the number of neighboring pixels forming the region $\Gamma$. The generation of the address signals from the address generator 107 is performed by activating a RUN signal 108 fed to the address generator 107. When the storage section of the multiplication/addition unit 110 is fully filled with the input data, the unit 110 outputs a FULL signal 118 to the address generator 107 to deactivate a write signal 119 to interrupt further writing the data into the unit 110. Similarly, further writing the data into the other multiplication/addition units 111-115 can also be interrupted. The details will be explained later with reference to FIG. 2.

The multiplication/addition unit 110 receives the data of the gradient Ix from the memory 104. The multiplication/addition unit 111 receives the data of the gradients Ix and Iy from the memories 104 and 105. The multiplication/addition unit 112 receives the data of the gradients Ix and It from the memories 104 and 106. The multiplication/addition unit 113 receives the data of the gradient Iy from the memory 105. The multiplication/addition unit 114 receives the data of the gradients Iy and It from the memories 105 and 106. The multiplication/addition unit 115 receives the data of the gradient It from the memory 106. The multiplication/addition units 110-115 calculates the values Sxx, Sxy, Sxt, Syy, Syt, and Stt from the received data of the gradients by referring to the equations (7-a) to (7-f) respectively. The multiplication/addition units 110-115 outputs data of the calculated values Sxx, Sxy, Sxt, Syy, Syt, and Stt to a determinant calculator 116. The size of the region $\Gamma$ exposed to the multiplication/addition by the multiplication/addition units 110-115 is determined by the window size designation signal 109. The details will be explained later with reference to FIG. 3.

The determinant calculator 116 calculates the determinant det[S] from the values Sxx, Sxy, Sxt, Syy, Syt, and Stt by referring to the equation (8). When input storage sections of the determinant calculator 116 are fully filled with the input data and can not receive further input data, the determinant calculator 116 outputs FULL signals FULLxx-FULLtt to the multiplication/addition units 110-115 to interrupt further feed of the data from the units 110-115 to the determinant calculator 116. The determinant calculator 116 outputs data of the calculated value det[S] to a Q/P signal generator 117. The data of the values Sxx, Syy, and Stt are fed to the Q/P signal generator 117 through the determinant calculator 116. The determinant calculator 116 outputs a WT signal 120 to the Q/P signal generator 117 which determines a timing of writing the data into input storage sections of the Q/P signal generator 117. The determinant calculator 116 is activated in response to the RUN signal 108. The details will be explained later with reference to FIG. 4.

The Q/P signal generator 117 calculates the appearance characteristic quantity Q from the values det[S], Sxx, Syy, and Stt by referring to the equation (17). In addition, the Q/P signal generator 117 calculates the motion characteristic quantity P from the values det[S], Sxx, Syy, and Stt by referring to the equation (18). The Q/P signal generator 117 outputs data of the calculated appearance characteristic quantity Qij and the calculated motion characteristic quantity Pij. In addition, the Q/P signal generator 117 outputs a write signal WT which enables writing the output data into a memory (not shown). The details will be explained later with reference to FIG. 5.

Figure 2:
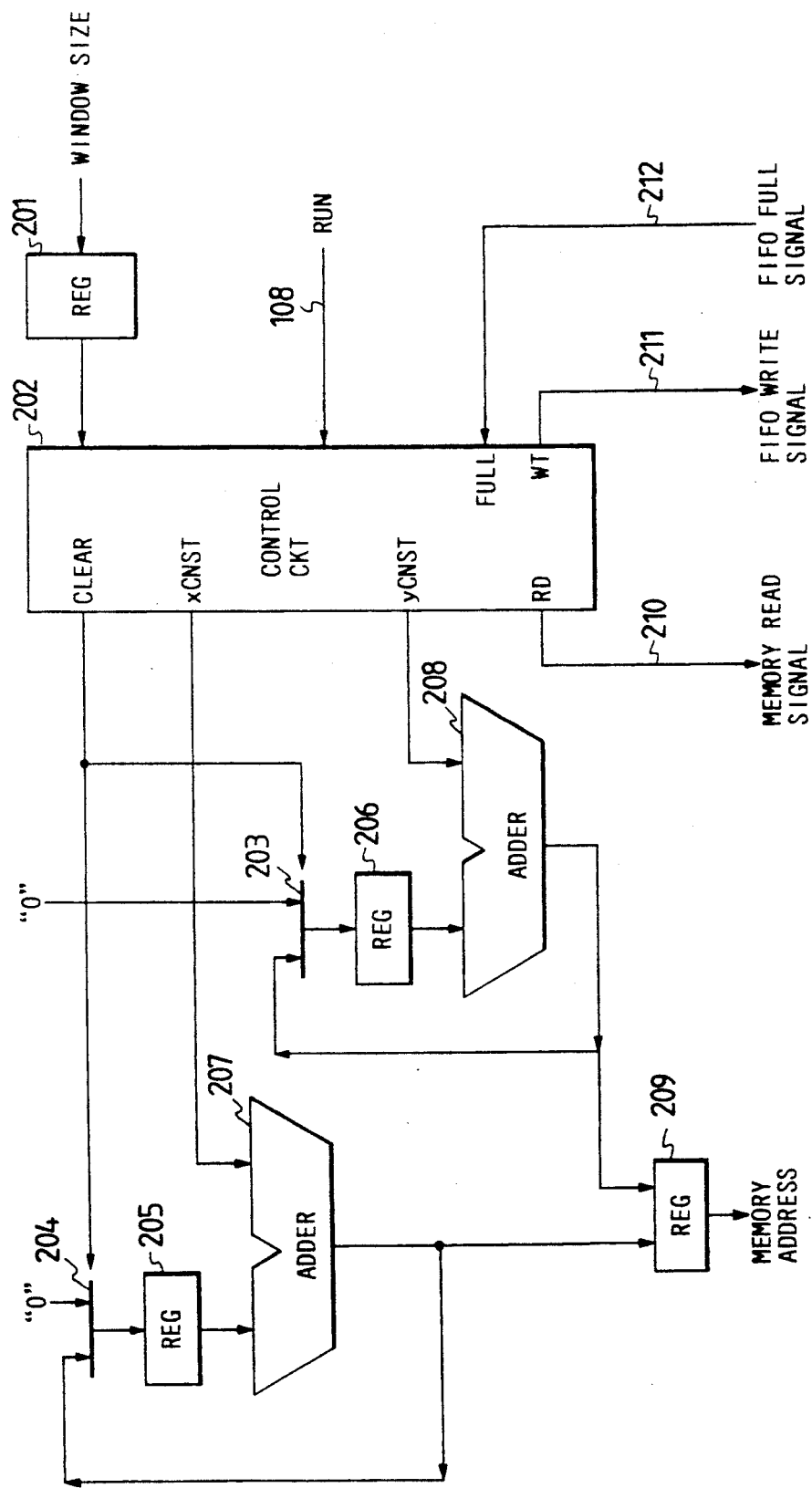
FIG. 2 is a block diagram of the address generator in FIG. 1.

FIG. 2 shows the internal structure of the address generator 107. As shown in FIG. 2, the address generator 202 includes a register 201 storing data of the window size designation signal 109 which determines the number of neighboring pixels subjected to the multiplication/addition. The window size designation data are fed from the register 201 to a control circuit 202. When the window size designation data represent "3", $3 \times 3$ neighboring pixels at and around the lattice point (i, j) of the present pixel are designated and the address generator 107 outputs such an address signal as to sequentially read out the data of the designated pixels from the memories 104, 105, and 106.

For example, the control circuit 202 is made of a programmable microprocessor. The control circuit 202 is activated in response to the RUN signal 108. When the RUN signal 108 assumes an active state, the control circuit 202 is moved into an initial state. Then, the control circuit 202 operates to sequentially transfer the data of the designated neighboring pixels from the memories 104-106 to the multiplication/addition units 110-115.

The operation of the control circuit 202 will be further explained. When the control circuit 202 assumes the initial state, the control circuit 202 outputs a control signal CLEAR to selectors 203 and 204 so that "0" is transmitted to registers 205 and 206. As will be made clear hereinafter, the i component and the j component of data of the lattice point (i, j) of the present pixel are stored in the registers 205 and 206 respectively.

In the case where the stored data contents of the register 205 is "i" and the stored data contents of the register 206 is "j", the control circuit 202 controls various devices as follows. The control circuit 202 divides the window size designation number by two and converts the resulting quotient into a corresponding negative number. Data of the negative number is outputted to adders 207 and 208 as signals xCNST and yCNST. The adder 207 adds the negative number xCNST and the number represented by the stored contents of the register 205. The output data from the adder 207 is stored into a register 209. The adder 208 adds the negative number yCNST and the number represented by the stored contents of the register 206. The output data from the adder 208 is stored into the register 209. The register 209 outputs a memory address signal composed of the output data from the adders 207 and 208. The memory address signal is fed to the memories 104-106 (see FIG. 1). The memory address signal designates one-pixel data read out from the memories 104-106. Then, the control circuit 202 activates a memory read signal 210 fed to the memories 104-106 and activates a fifo write signal 211 fed to input fifo (first in first out) buffers of the multiplication/addition units 110-115. enabling the designated one-pixel data to be transferred from the memories 104-106 to the multiplication/addition units 110-115.

In the case where a fifo full signal 212 fed from the multiplication/addition units 110-115 to the control circuit 202 is active, that is, in the case where the input fifo buffers of the multiplication/addition units 110-115 are fully filled with data and can not receive further data, the control circuit 202 holds the fifo write signal 211 inactive until the fifo full signal 212 returns to the inactive state.

In the previously-mentioned sequence, the one-pixel data are transferred from the memories 104-106 to the multiplication/addition units 110-115. Then, the data of a subsequent pixel are transferred from the memories 104-106 to the multiplication/addition units 110-115 as follows. The control circuit 202 increments the number xCNST by "1" and thereby updates the number xCNST fed to the adder 207 but holds unchanged the number yCNST fed to the adder 208. The adder 207 adds the new number xCNST and the number represented by the stored contents of the register 205. The adder 208 adds the unchanged number yCNST and the number represented by the stored contents of the register 206. As a result, the memory address signal is updated and denotes a new address whose i component is incremented by "1" relative to the previous i component but whose j component is unchanged. Data are read out from the memories 104-106 in response to the new memory address signal.

Such a process is reiterated while the i component of the address is repeatedly incremented by "1". When the i component of the address reaches the address value of the right-hand edge of the window region, the i component of the address is made back to the address value of the left-hand edge of the window region and the j component of the address is incremented by "1". Then, a process of reading out the data from the memories 104-106 is reiterated while the i component of the address is repeatedly incremented by "1" but the j component of the address is held unchanged.

For example, in the case where the window size designation number is "3" and the lattice point of the present pixel is denoted by the address (i, j), the following nine addresses designating the present pixel and neighboring pixels around the present pixel are sequentially prepared in the register 209: (i−1, j−1), (i, j−1), (i+1, j−1), (i−1, j), (i, j), (i+1, j), (i−1, j+1), (i, j+1), and (i+1, j+1).

When the access to the data of the present pixel and the neighboring pixels around the present pixel is completed, the control circuit 202 sets the number xCNST to "1". The adder 207 adds "1" and the number represented by the data in the register 205. At the same time, the control circuit 202 controls the selector 204 so that the output data from the adder 207 are transmitted to the register 205. In the register 205, the previous data are replaced by the output data from the adder 207 so that the i component of the address is incremented by "1". During this period, the j component of the address which is stored in the register 206 remains unchanged as long as the present pixel separates from an end of a scan line. In this way, the address of the present pixel is changed from (i, j) to (i+1, j).

When the j component of the address reaches the end of the scan line, the control circuit 202 sets "0" to the register 205 and increments the number in the register 206 by "1". These processes are realized as follows. The control circuit 202 controls the selector 204 so that "0" is transmitted to and stored into the register 205. The control circuit 202 sets the number yCNST to "1". The adder 208 adds "1" and the number represented by the data in the register 206. At the same time, the control circuit 202 controls the selector 203 so that the output data from the adder 208 is transmitted to the register 206. In the register 206, the previous data are replaced by the output data from the adder 208 so that the j component of the address is incremented by "1". As a result, the address of the present pixel is set as (0, j+1).

Similar processes are performed for all the scan lines. When the processes are completed, that is, when all the data have been read out from the memories 104-106, the control circuit 202 moves into a stand-by state or a waiting state.

Figure 3:
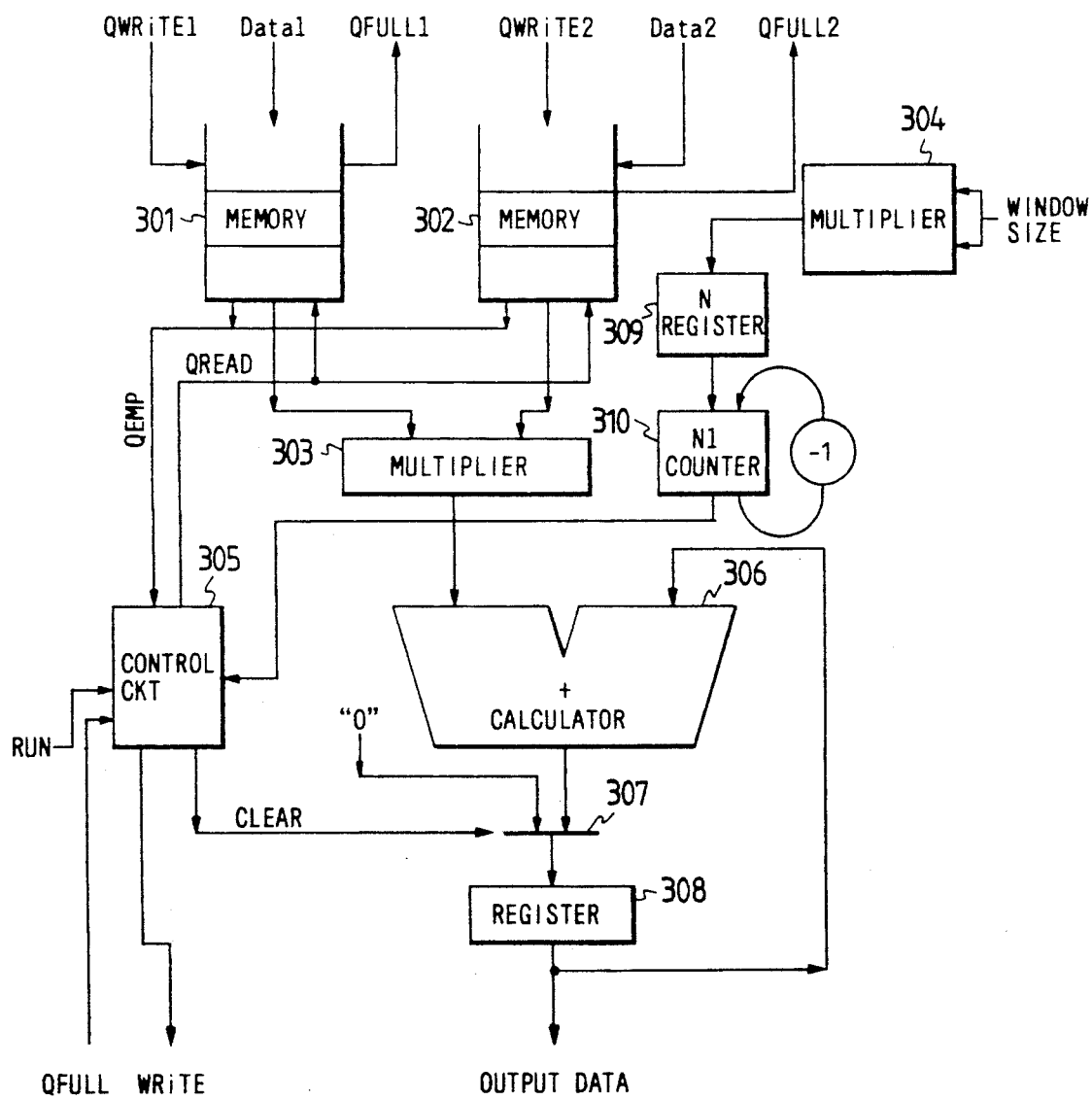
FIG. 3 is a block diagram of the multiplication/addition unit in FIG. 1.

The multiplication/addition units 110-115 have similar internal structures. FIG. 3 shows the internal design of one of the multiplication/addition units 110-115. As shown in FIG. 3, the multiplication/addition unit includes input fifo memories 301 and 302 loaded with data of a pixel from two of the memories 104-106 (see FIG. 1). The timing of loading the data on the fifo memories 301 and 302 is determined by write signals QWRiTE1 and QWRiTE2 fed from the address generator 107 (see FIG. 1). In the absence of an empty slot of the fifo memories 301 and 302, the fifo memories 301 and 302 output active full signals QFULL1 and QFULL2 to the address generator 107 (see FIG. 1) to prevent further transfer of data to the fifo memories 301 and 302.

A multiplier 304 calculates the square of the number represented by the widow size designation signal. The output data from the multiplier 304 are stored into a register 309. By use of the number represented by the output data from the multiplier 304, a control circuit 305 determines the number of data which should be read from the fifo memories 301 and 302 to perform the multiplication/addition.

For example, the control circuit 305 is made of a programmable microprocessor. In the case where the RUN signal is active, the control circuit 305 reiterates the following processes as long as data are present in the fifo memories 301 and 302, that is, as long as QEMP signals outputted from the fifo memories 301 and 302 are inactive. At first, the control circuit 305 controls a selector 307 so that "0" is stored into a register 308. In addition, the contents of the register 309 are copied into a counter 310. At this time, the control circuit 305 outputs active QREAD signals to the fifo memories 301 and 302 and transfers the data from the fifo memories 301 and 302 to a multiplier 306. The multiplier 306 multiplies the data fed from the fifo memories 301 and 302. The output data from the multiplier 306 and the output data from the register 308 are added by an adder 306. The control circuit 305 controls the selector 307 so that the output data from the adder 306 are transmitted to and stored into the register 308. Accordingly, the data stored in the register 308 are updated.

Next, the number represented by the data in the counter 310 is decremented by "1". As long as the number represented by the data in the counter 310 differs from "0", the control circuit 305 activates the QREAD signals and transfers subsequent data from the fifo memories 301 and 302 to the multiplier 303. The multiplier 306 multiplies the data fed from the fifo memories 301 and 302. The output data from the multiplier 306 and the output data from the register 308 are added by an adder 306. The output data from the adder 306 are transmitted to and stored into the register 308. Accordingly, the data stored in the register 308 are updated.

When the number represented by the data in the counter 310 equals "0", the control circuit 305 outputs an active WRiTE signal to the determinant calculator 116 (see FIG. 1) and transfers the data from the register 308 to the determinant calculator 116 as output data from the multiplication/addition unit. In the case where the determinant calculator 116 is unready for receiving data, that is, in the case where a QFULL signal outputted from the determinant calculator 116 to the control circuit 305 is active, the transfer of the data from the register 308 to the determinant calculator 116 is suspended until the QFULL signal becomes inactive.

When these processes are completed, one piece of multiplication/addition data are transferred to the determinant calculator 116. Then, in order to generate subsequent multiplication/addition data, the control circuit 305 copies the contents of the register 309 into the counter 310 and activates the QREAD signals to start the multiplication/addition again.

Thus, the value of the data D outputted from the multiplication/addition unit 110 are expressed as follows.

$$D = Ixi - Nj - N^2 + Ixi - N + 1j - N^2 + \ldots +$$
$$Ixi + Nj^2 - N + Ixi - Nj - N^2 + 1 + Ixi - N + 1j -$$
$$N^2 + 1 + \ldots + Ixi + Nj^2 - N + 1 + \ldots +$$
$$Ixi - Nj + N^2 + Ixi - N + 1j + N^2 + \ldots + Ixi + N^2j + N$$

where the letter N denotes the size of one side of the window and the character Ixij denotes the data of the pixel (i, j) which are stored in the memory 104. Thus, the multiplication/addition unit 110 calculates the value given by the equation (7-a).

Figure 4:
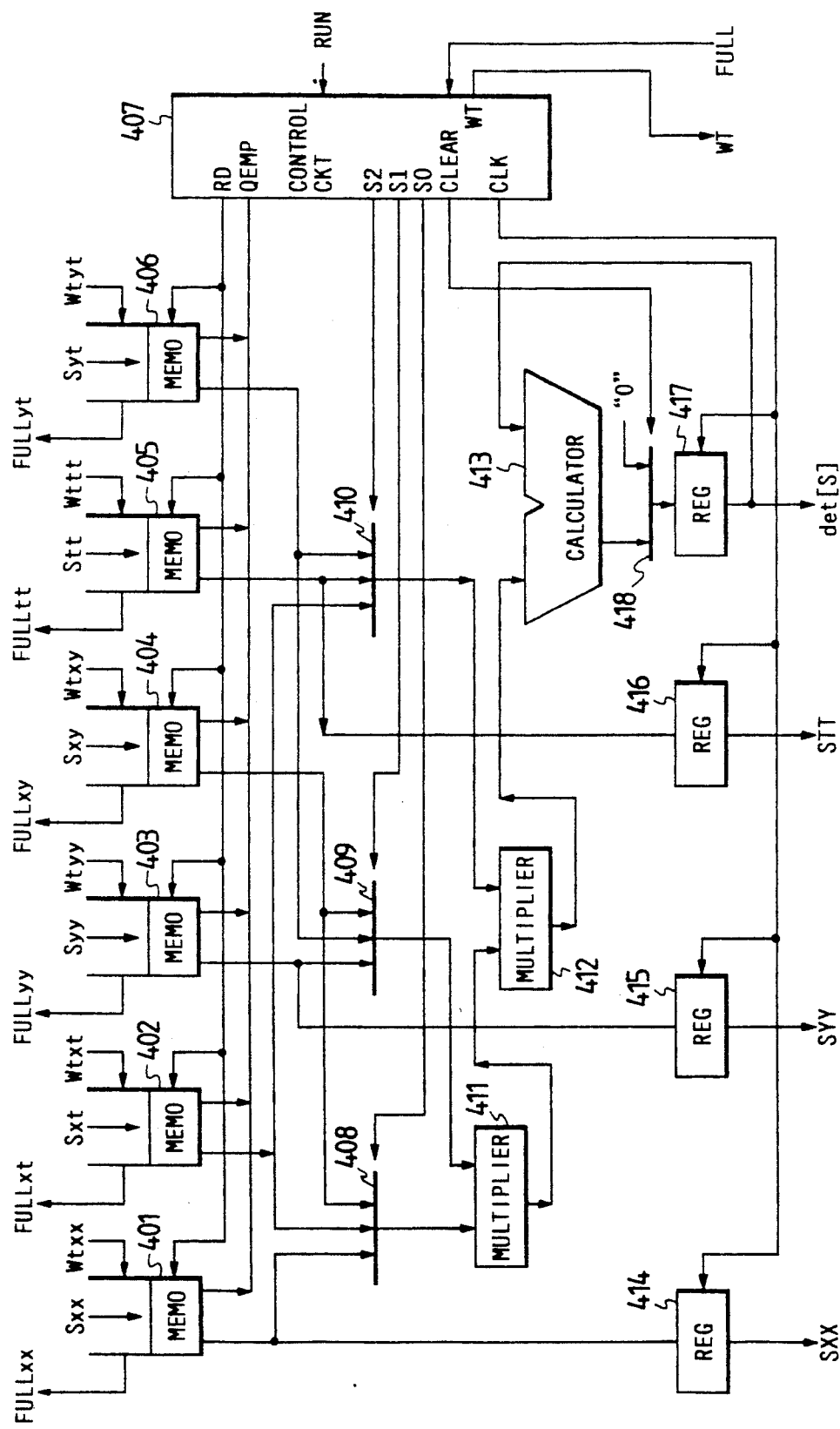
FIG. 4 is a block diagram of the determinant calculator in FIG. 1.

FIG. 4 shows the internal structure of the determinant calculator 116. As shown in FIG. 4, the determinant calculator 116 includes input fifo memories 401, 402, 403, 404, 405, and 406 loaded with the data of the respective values Sxx, Sxt, Syy, Sxy, Stt, and Syt from the multiplication/addition units 110-115 (see FIG. 1). The timings of loading the data on the fifo memories 401-406 are determined by respective write signals Wtxx, Wtxt, Wtyy, Wtxy, Wttt, and Wtyt fed from the multiplication/addition units 110-115 (see FIG. 1). In the absence of an empty slot of the fifo memories 401-406, the fifo memories 401-406 output active full signals FULLxx, FILLxt, FULLyy, FULLxy, FULLtt, and FULLty to the multiplication/addition units 110-115 (see FIG. 1) to prevent further transfer of data to the fifo memories 401-406.

A control circuit 407 generates various signals to calculate the value det[S] by use of the following equation.

$$det[S] = SxxSyyStt + SxySytSxt + SxtSxySyt - Sxx\cdot Syt^2 - SyySxt^2 - SttSxy^2$$

For example, the control circuit 407 is made of a programmable microprocessor. The control circuit 407 operates as follows.

When the RUN signal is activated, the control circuit 407 starts to reiterate the following processes. At first, the control circuit 407 outputs an active CLEAR signal to a selector 418 so that "0" is transmitted to a register 417. The control circuit 407 outputs a CLK signal to the register 417, storing "0" into the register 417. Next, as long as the fifo memories 401-406 are not empty, that is, as long as QEMP signals outputted from the fifo memories 401-406 to the control circuit 407 are inactive, the control circuit 407 outputs active RD signals to the fifo memories 401-406 and reads out the data from the fifo memories 401-406. The control circuit 407 outputs signals S0, S1, and S2 to selectors 408, 409, and 410 to control the selectors 408, 409, and 410 respectively. Initially, the selectors 408, 409, and 410 select the output data Sxx, Syy, and Stt from the fifo memories 401, 403, and 405 so that multipliers 411 and 412 multiply the data Sxx, Syy, and Stt to calculate the value SxxSyyStt. The control circuit 407 sets a calculator 413 into an addition mode state, so that the calculator 413 adds the output data SxxSyyStt from the multiplier 412 and the output data "0" from the register 417. The control circuit 407 controls the selector 418 so that the output data from the calculator 413 are transmitted to and stored into the register 417. In this way, the data in the register 417 are updated to the value SxxSyyStt. Next, the selectors 408, 409, and 410 select the output data Sxy, Syt, and Sxt from the fifo memories 404, 406, and 402 so that the multipliers 411 and 412 multiply the data Sxy, Syt, and Sxt to calculate the value SxySytSxt. The control circuit 407 holds the calculator 413 in the addition mode state, so that the calculator 413 adds the output data SxySytSxt from the multiplier 412 and the output data SxxSyyStt from the register 417. The control circuit 407 controls the selector 418 so that the output data from the calculator 413 are transmitted to and stored into the register 417. In this way, the data in the register 417 are updated to the value SxxSyyStt+SxySytSxt. Next, the selectors 408, 409, and 410 select the output data Sxt, Sxy, and Syt from the fifo memories 402, 404, and 406 so that the multipliers 411 and 412 multiply the data Sxt, Sxy, and Syt to calculate the value SxtSxySyt. The control circuit 407 holds the calculator 413 in the addition mode state, so that the calculator 413 adds the output data SxtSxySyt from the multiplier 412 and the output data SxxSyyStt+SxySytSxt from the register 417. The control circuit 407 controls the selector 418 so that the output data from the calculator 413 are transmitted to and stored into the register 417. In this way, the data in the register 417 are updated to the value SxxSyyStt+SxySytSxt+SxtSxySyt. Next, the selectors 408, 409, and 410 select the output data Sxx, Syt, and Syt from the fifo memories 401 and 406 so that the multipliers 411 and 412 multiply the data Sxx, Syt, and Syt to calculate the value SxxSyt². The control circuit 407 changes the calculator 413 to a subtraction mode state, so that the calculator 413 subtracts the output data SxxSyt² of the multiplier 412 from the output data SxxSyyStt+SxySytSxt+SxtSxySyt of the register 417. The control circuit 407 controls the selector 418 so that the output data from the calculator 413 are transmitted to and stored into the register 417. In this way, the data in the register 417 are updated to the value SxxSyyStt+SxySytSxt+SxtSxySyt−SxxSyt². Next, the selectors 408, 409, and 410 select the output data Sxt, Syy, and Sxt from the fifo memories 402 and 403 so that the multipliers 411 and 412 multiply the data Sxt, Syy, and Sxt to calculate the value SyySxt². The control circuit 407 holds the calculator 413 in the subtraction mode state, so that the calculator 413 subtracts the output data SyySxt² of the multiplier 412 from the output data SxxSyyStt+SxySytSxt+SxtSxySyt−SxxSyt² of the register 417. The control circuit 407 controls the selector 418 so that the output data from the calculator 413 are transmitted to and stored into the register 417. In this way, the data in the register 417 are updated to the value SxxSyyStt+SxySytSxt+SxtSxySyt−SxxSyt²−SyySxt². Finally, the selectors 408, 409, and 410 select the output data Sxy, Sxy, and Stt from the fifo memories 404 and 405 so that the multipliers 411 and 412 multiply the data Sxy, Sxy, and Stt to calculate the value SttSxy². The control circuit 407 holds the calculator 413 in the subtraction mode state, so that the calculator 413 subtracts the output data SttSxy² of the multiplier 412 from the output data SxxSyyStt+SxySytSxt+SxtSxySyt−SxxSyt²−SyySxt² of the register 417. The control circuit 407 controls the selector 418 so that the output data from the calculator 413 are transmitted to and stored into the register 417. In this way, the data in the register 417 are updated to the value SxxSyyStt+SxySytSxt+SxtSxySyt−SxxSyt²−SyySxt²−SttSxy² equal to the value det[S].

At this time, the data Sxx, Syy, and Stt are stored in registers 414, 415, and 416 respectively. In the case where a FULL signal fed from the Q/P signal generator 117 (see FIG. 1) to the control circuit 407 is inactive, the control circuit 407 outputs an active Wt signal to the Q/P signal generator 117 (see FIG. 1) to transfer the data Sxx, Syy, Stt, and det[S] from the registers 414–417 to the Q/P signal generator 117.

After the outputting of one set of the data from the determinant calculator 116 to the Q/P signal generator 117 is completed, the control circuit 407 starts processes of reading out the subsequent data from the fifo memories 401–406 and generating the next values Sxx, Syy, Stt, and det[S].

Figure 5:
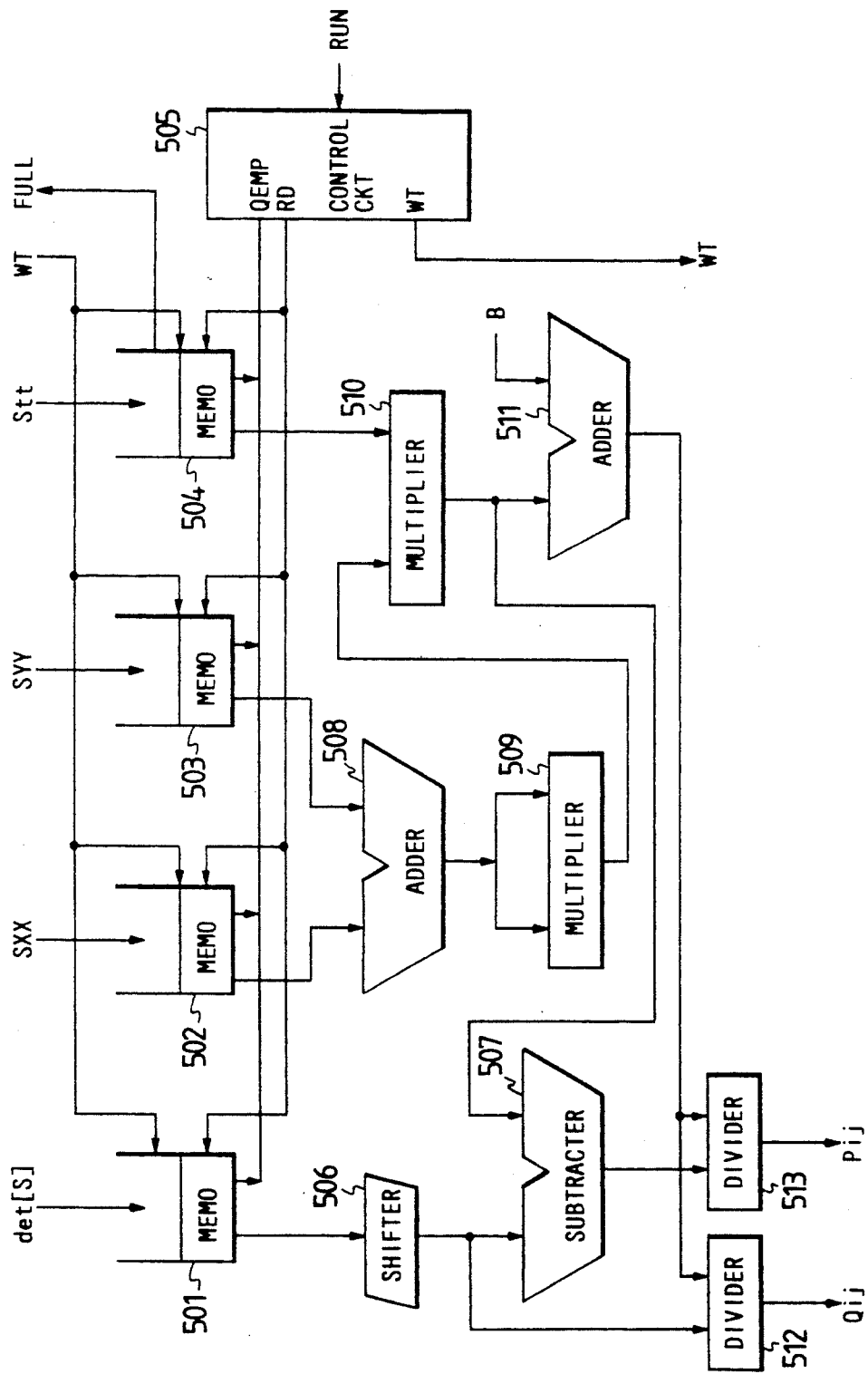
FIG. 5 is a block diagram of the Q/P signal generator in FIG. 1.

FIG. 5 shows the internal structure of the Q/P signal generator 117. As shown in FIG. 5, the Q/P signal generator 117 includes input fifo memories 501, 502, 503, and 504 which are loaded with the respective data det[S], Sxx, Syy, and Stt from the determinant calculator 116 (see FIG. 1) in response to WT signals fed from the determinant calculator 116. In the absence of an empty slot of the fifo memories 501–504, the fifo memories 501–504 output active FULL signals to the determinant calculator 116 (see FIG. 1) to prevent further transfer of data to the fifo memories 501–504.

A control circuit 505 is activated in response to the RUN signal. The control circuit 505 generates various signals to derive output data Qij and Pij from the values det[S], Sxx, Syy, and Stt. In addition, the control circuit 505 outputs a WT signal for writing the data Qij and Pij into an external memory. For example, the control circuit 505 is made of a programmable microprocessor. The control circuit 505 operates as follows.

In the case where QEMP signals fed from the fifo memories 501–504 to the control circuit 505 are inactive, that is, in the case where data are present in the fifo memories 501–504, the control circuit 505 outputs active RD signals to the fifo memories 501–504 and reads out the data det[S], Sxx, Syy, and Stt from the fifo memories 501–504. The output data det[S] from the fifo memory 501 are subjected to a 2-bit leftward shift by a shifter 506 and are converted into the value 4det[S]. An adder 508 adds the values Sxx and Syy and feeds the resultant Sxx+Syy to a multiplier 509. The multiplier 509 squares the value Sxx+Syy and derives the value (Sxx+Syy)². A multiplier 510 multiplies the output data (Sxx+Syy)² from the multiplier 509 by the data Stt and calculates the value (Sxx+Syy)²Stt. An adder 511 adds the output data (Sxx+Syy)²Stt from the multiplier 510 and a predetermined value B. The predetermined value B corresponds to the noise term $\sigma_s^4\sigma_t^2$ in the equations (17) and (18). Specifically, the value B is set as follows.

$$B = (0.5^2 \cdot NO)^2$$

where the letter NO denotes the number of pixels within the window. Thus, the adder 511 outputs the value $(Sxx+Syy)^2 Stt + \sigma_s^4\sigma_t^2$ where the term $\sigma_s^4\sigma_t^2$ equals the predetermined value B. A subtracter 507 substracts the output data 4det[S] of the shifter 506 from the output data (Sxx+Syy)²Stt of the multiplier 510 and derives the value (Sxx+Syy)²Stt−4det[S]. A divider 512 divides the output data 4det[S] from the shifter 506 by the output data $(Sxx+Syy)^2 Stt + \sigma_s^4\sigma_t^2$ from the adder 511 and derives the value expressed as follows.

$$\{4det[S]\} / \{(Sxx+Syy)^2 Stt + \sigma_s^4\sigma_t^2\}$$

The output data from the divider 512 agree with the appearance characteristic value Qij given by the equation (17). A divider 513 divides the output data (Sxx+Syy)²Stt−4det[S] from the substracter 507 by the output data $(Sxx+Syy)^2 Stt + \sigma_s^4\sigma_t^2$ from the adder 511 and derives the value expressed as follows.

$$\{(Sxx+Syy)^2 Stt - 4det[S]\} / \{(Sxx+Syy)^2 Stt + \sigma_s^4\sigma_t^2\}$$

The output data from the divider 513 agree with the motion characteristic value Pij given by the equation (18).

In this way, the appearance characteristic value Qij and the motion characteristic value Pij can be obtained at the output terminals of the dividers 512 and 513. For each of points of a moving image, it is possible to detect whether a character of the data at the point is of the moving type or of the unmoving type on the basis of the appearance characteristic value Q and the motion characteristic value P. In addition, it is possible to detect the motion of an object within the moving image, the appearance of an unexpected object within the moving image, and the presence of a foreign object within the moving image.

Figure 8:
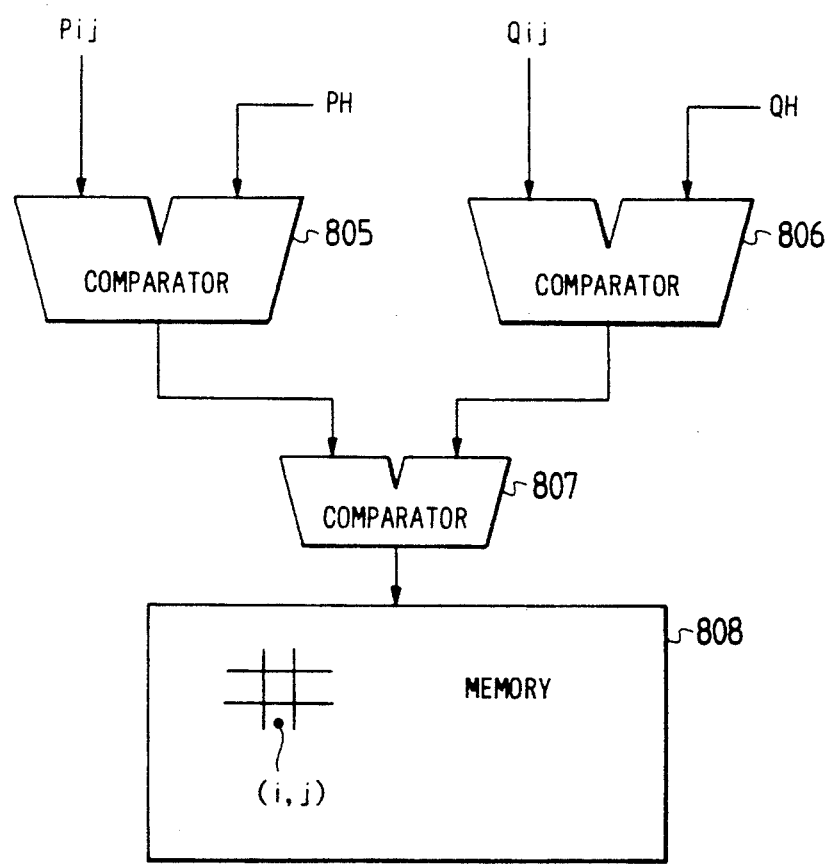
FIG. 8 is a block diagram of a judgment section in the apparatus of the embodiment of this invention.

FIG. 8 shows a judgment section of the apparatus of the embodiment of this invention. As shown in FIG. 8, the judgment section includes comparators 805 and 806 which receive the motion characteristic value Pij and the appearance characteristic value Qij from the Q/P signal generator 117 (see FIG. 1) respectively. The comparator 805 compares the motion characteristic value Pij with a predetermined threshold value PH. When the motion characteristic value Pij exceeds the threshold value PH, the comparator 805 passes the value Pij to a comparator 807. When the motion characteristic value Pij is equal to or smaller than the threshold value PH, the comparator 805 outputs "0" to the comparator 807. In this way, the comparator 805 discriminates between a negligible motion characteristic value and an appreciable motion characteristic value, and rejects the negligible motion characteristic value. The comparator 806 compares the appearance characteristic value Qij with a predetermined threshold value QH. When the appearance characteristic value Qij exceeds the threshold value QH, the comparator 806 passes the value Qij to the comparator 807. When the appearance characteristic value Qij is equal to or smaller than the threshold value QH, the comparator 806 outputs "0" to the comparator 807. In this way, the comparator 806 discriminates between a negligible appearance characteristic value and an appreciable appearance characteristic value, and rejects the negligible appearance characteristic value. The comparator 807 compares the output data from the comparators 805 and 806. When the output value from the comparator 805 exceeds the output value from the comparator 806, that is, when the motion characteristic is dominant, the comparator 807 outputs "2". When the output value from the comparator 805 is equal to or smaller than the output value from the comparator 806, that is, when the appearance characteristic is dominant, the comparator 807 outputs "1". When both the output value from the comparator 805 and the output value from the comparator 806 are "0", that is, when both the motion characteristic and the appearance characteristic are negligible, the comparator 807 outputs "0". In this way, the output signal from the comparator 807 represents whether the condition of data of the pixel is of the moving type, of the appearing type, or of the unmoving type. Specifically, when the output signal from the comparator 807 assumes "2", the condition of data of the pixel is of the moving type. When the output signal from the comparator 807 assumes "1", the condition of data of the pixel is of the appearing type. When the output signal from the comparator 807 assumes "0", the condition of data of the pixel is of the unmoving type. The output data from the comparator 807 is stored into a storage location of a memory 808 which is designated by an address (i, j).

A moving region in a moving image is detected by examining the stored data contents of the memory 808 as follows. Firstly, pixels having the data value "1" are traced in the memory 808, and the boundary of a moving/appearing region is detected. Then, the data values of the pixels within the moving/appearing region are checked. When the data values of the pixels within the moving/appearing region are "2", the moving/appearing region is judged to be a moving region. When the data values of the pixels within the moving/appearing region are "1", the moving/appearing region is judged to be an appearing region.

What is claimed is:

1. An apparatus for detecting a condition of data of a pixel in an image, comprising:

means for deriving a gradient Ixij of a horizontal x component of temporally successive image data for a plurality of pixels;

means for deriving a gradient Iyij or a vertical y component of the temporally successive image data for a plurality of pixels;

means for deriving a gradient Itij of a time component of the temporally successive image data for a plurality of pixels;

means for calculating values Sxx, Sxy, Syy, Sxt, Syt, and Stt for neighboring pixels within a predetermined region, the values Sxx, Sxy, Syy, Sxt, Syt, and Stt are given as:

$Sxx = \Sigma Ixij^2$ $Sxy = \Sigma Ixij Iyij$ $Syy = \Sigma Iyij^2$ $Sxt = \Sigma Ixij Itij$ $Syt = \Sigma Iyij Itij$ $Stt = \Sigma Itij^2$ means for generating a parameter signal from the values Sxx, Sxy, Syy, Sxt, Syt, and Stt, the parameter signal representing whether a condition of data of a pixel within the predetermined region is of the moving type, the appearing type or the unmoving type.

2. An apparatus for detecting a condition of data of a pixel in an image, comprising:

means for deriving a gradient Ixij of a horizontal x component of temporally successive image data for a plurality of pixels;

means for deriving a gradient Iyij of a vertical y component of the temporally successive image data for a plurality of pixels;

means for deriving a gradient Itij of a time component of the temporally successive image data for a plurality of pixels;

means for calculating values Sxx, Sxy, Syy, Sxt, Syt, and Stt for neighboring pixels within a predetermined region, the values Sxx, Sxy, Syy, Sxt, Syt, and Stt are given as:

$Sxx = \Sigma Ixij^2$ $Sxy = \Sigma Ixij Iyij$ $Syy = \Sigma Iyij^2$ $Sxt = \Sigma Ixij Itij$ $Syt = \Sigma Iyij Itij$ $Stt = \Sigma Itij^2$ means for generating a parameter signal from the values Sxx, Sxy, Syy, Sxt, Syt, and Stt, the parameter signal representing whether a condition of data of a pixel within the predetermined region is of the moving type, the appearing type or the unmoving type according to an appearance of an object.

3. An apparatus for examining a condition of data of a pixel in an image, comprising:

means for deriving a gradient Ixij of a horizontal x component of temporally successive image data for a plurality of pixels;

means for deriving a gradient Iyij of a vertical y component of the temporally successive image data for a plurality of pixels;

means for deriving a gradient Itij of a time component of the temporally successive image data for a plurality of pixels;

means for calculating values Sxx, Sxy, Syy, Sxt, Syt, and Stt for neighboring pixels within a predetermined region, the values Sxx, Sxy, Syy, Sxt, Syt, and Stt are given as:

$$Sxx = \Sigma Ixij^2$$

$$Sxy = \Sigma IxijIyij$$

$$Syy = \Sigma Iyij^2$$

$$Sxt = \Sigma IxijItij$$

$$Syt = \Sigma IyijItij$$

$$Stt = \Sigma Itij^2$$

means for generating a first parameter signal from the values Sxx, Sxy, Syy, Sxt, Syt, and Stt, the first parameter signal representing a degree at which data of a pixel within the predetermined region are affected by a motion;

means for generating a second parameter signal from the values Sxx, Sxy, Syy, Sxt, Syt, and Stt, the second parameter signal representing a degree at which data of said pixel within the predetermined region are affected by an appearance of an object; and means for detecting whether data of said pixel within the predetermined region are moving or unmoving from the first parameter signal and the second parameter signal, and for detecting whether data of said pixel within the predetermined region are varied by the motion or the appearance of the object from the first parameter signal and the second parameter signal.

4. The apparatus of claim 3 wherein the first parameter signal represents a parameter Pij given as:

$$Pij = \{(Sxx+Syy)^2 Stt - 4det[S]\}/\{(Sxx+Syy)^2 Stt + A\}$$

where A denotes a predetermined constant and det[S] is given as:

$$det[S] = SxxSyyStt + SxySytSxt + SxtSxySyt - SxxSyt^2 - SyySxt^2 - SttSxy^2.$$

5. The apparatus of claim 3 wherein the second parameter signal represents a parameter Qij given as:

$$Qij = \{4det[S]\}/\{(Sxx+Syy)^2 Stt + A\}$$

where A denotes a predetermined constant and det[S] is given as:

$$det[S] = SxxSyyStt + SxySytSxt + SxtSxySyt - SxxSyt^2 - SyySxt^2 - SttSxy^2.$$

* * * * *